United States Patent [19]

Mutoh et al.

[11] Patent Number: 5,053,690

[45] Date of Patent: Oct. 1, 1991

[54] CONTROL METHOD OF PULSE WIDTH MODULATION INVERTER AND PULSE WIDTH MODULATION INVERTER SYSTEM

[75] Inventors: Nobuyoshi Mutoh, Katsuta; Keijiro Sakai, Hitachiota; Hiroshi Fujii, Chiba; Kenji Nantoh, Matsudo, all of Japan

[73] Assignee: Hitachi, Ltd., Tokyo, Japan

[21] Appl. No.: 441,964

[22] Filed: Nov. 28, 1989

[30] Foreign Application Priority Data

Nov. 30, 1988 [JP] Japan .................... 63-300525

[51] Int. Cl.$^5$ .............................. H02P 5/40
[52] U.S. Cl. .................... 318/811; 318/803; 318/798
[58] Field of Search ................ 318/798–803, 318/809–812; 388/864, 811, 819, 831, 829

[56] References Cited

U.S. PATENT DOCUMENTS

| 4,388,577 | 6/1983 | Blaschke et al. | 318/717 |
| 4,458,192 | 7/1984 | Sakamoto et al. | 318/806 X |
| 4,509,003 | 4/1985 | Ohnishi et al. | 318/803 X |
| 4,510,430 | 4/1985 | Ashikaga et al. | 318/803 X |
| 4,567,419 | 1/1986 | Watanabe | 318/805 X |
| 4,617,675 | 10/1986 | Ashikaga et al. | 318/811 X |
| 4,680,525 | 7/1987 | Kobari et al. | 318/798 |
| 4,904,920 | 2/1990 | Rufer | 318/800 |

FOREIGN PATENT DOCUMENTS

| 153494 | 1/1985 | Japan . |
| 736997 | 10/1985 | Japan . |
| 077896 | 9/1987 | Japan . |
| 2119590 | 3/1983 | United Kingdom . |

OTHER PUBLICATIONS

Elektronik, vol. 36, No. 19, Sep. 18, 1987, pp. 111–117, Drehstrommotor von ASIC gesteuert.

Primary Examiner—William M. Shoop, Jr.
Assistant Examiner—David Martin
Attorney, Agent, or Firm—Antonelli, Terry, Stout & Kraus

[57] ABSTRACT

In spatial vector control of a pulse width modulation (PWM) inverter adapted for variable speed drive of an induction motor, a difference vector between magnetic flux vectors occurring during adjacent sampling periods is generated by synthesizing a zero vector and voltage vectors in such a manner that a resultant voltage vector always includes as a component a minimum unit of a zero vector or a voltage vector, whereby even when the angular speed of rotation of the magnetic flux changes, the switching frequency of the PWM inverter is prevented from decreasing and the current ripple is reduced.

8 Claims, 8 Drawing Sheets

SETS OF UNIT VOLTAGE VECTORS TO BE SELECTED

|     | UNIT VOLTAGE VECTORS ($\overline{V_i}$, $\overline{V_j}$) | |
| --- | --- | --- |
| I   | (1, 1, 0) | (0, 1, 0) |
| II  | (0, 1, 0) | (0, 1, 1) |
| III | (0, 1, 1) | (0, 0, 1) |
| IV  | (0, 0, 1) | (1, 0, 1) |
| V   | (1, 0, 1) | (1, 0, 0) |
| VI  | (1, 0, 0) | (1, 1, 0) |

FIG.4

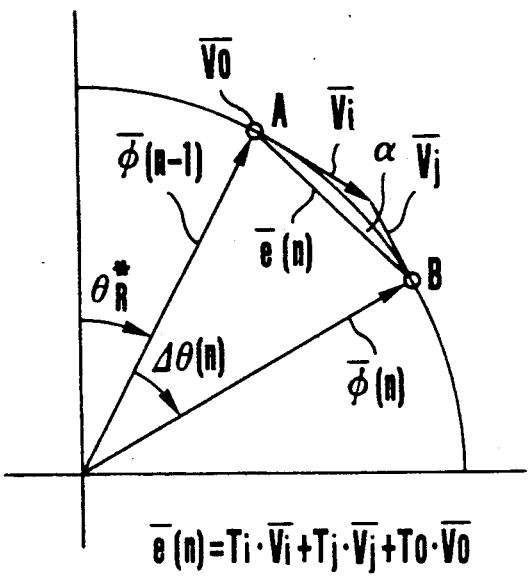

$$\overline{e}(n) = T_i \cdot \overline{V_i} + T_j \cdot \overline{V_j} + T_0 \cdot \overline{V_0}$$

FIG.5

SELECTED UNIT VOLTAGE VECTOR AND PHASE ANGLE

| | UNIT VOLTAGE VECTOR | PHASE ANGLE $\alpha$ |
|---|---|---|
| $V_1$ | (1, 0, 0) | $\theta_R^* - 270° + 1/2 \Delta\theta$ |
| $V_2$ | (1, 1, 0) | $\theta_R^* + 30° + 1/2 \Delta\theta$  (0 < $\theta_R^*$ < 30°)<br>$\theta_R^* - 330° + 1/2 \Delta\theta$  (270° < $\theta_R^*$ < 360°) |
| $V_3$ | (0, 1, 0) | $\theta_R^* - 30° + 1/2 \Delta\theta$ |
| $V_4$ | (0, 1, 1) | $\theta_R^* - 90° + 1/2 \Delta\theta$ |
| $V_5$ | (0, 0, 1) | $\theta_R^* - 150° + 1/2 \Delta\theta$ |
| $V_6$ | (1, 0, 1) | $\theta_R^* - 210° + 1/2 \Delta\theta$ |

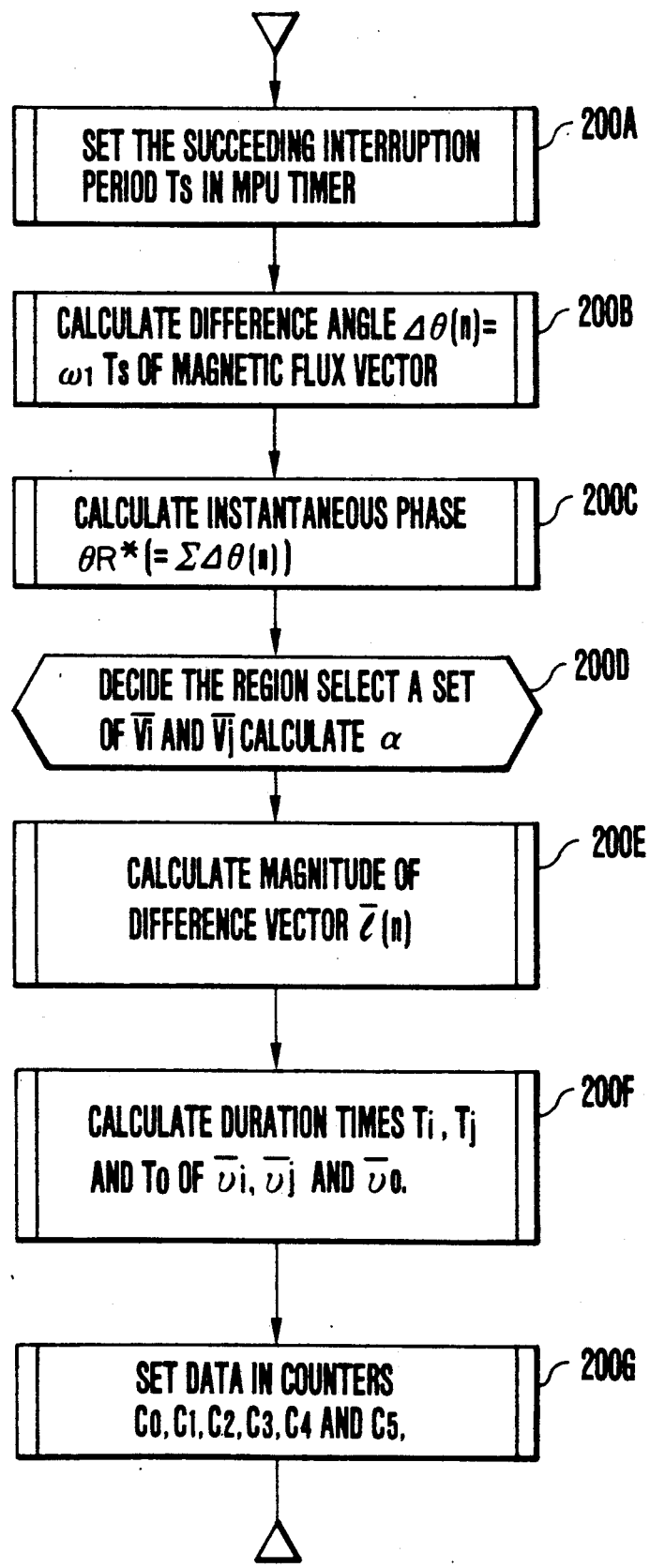

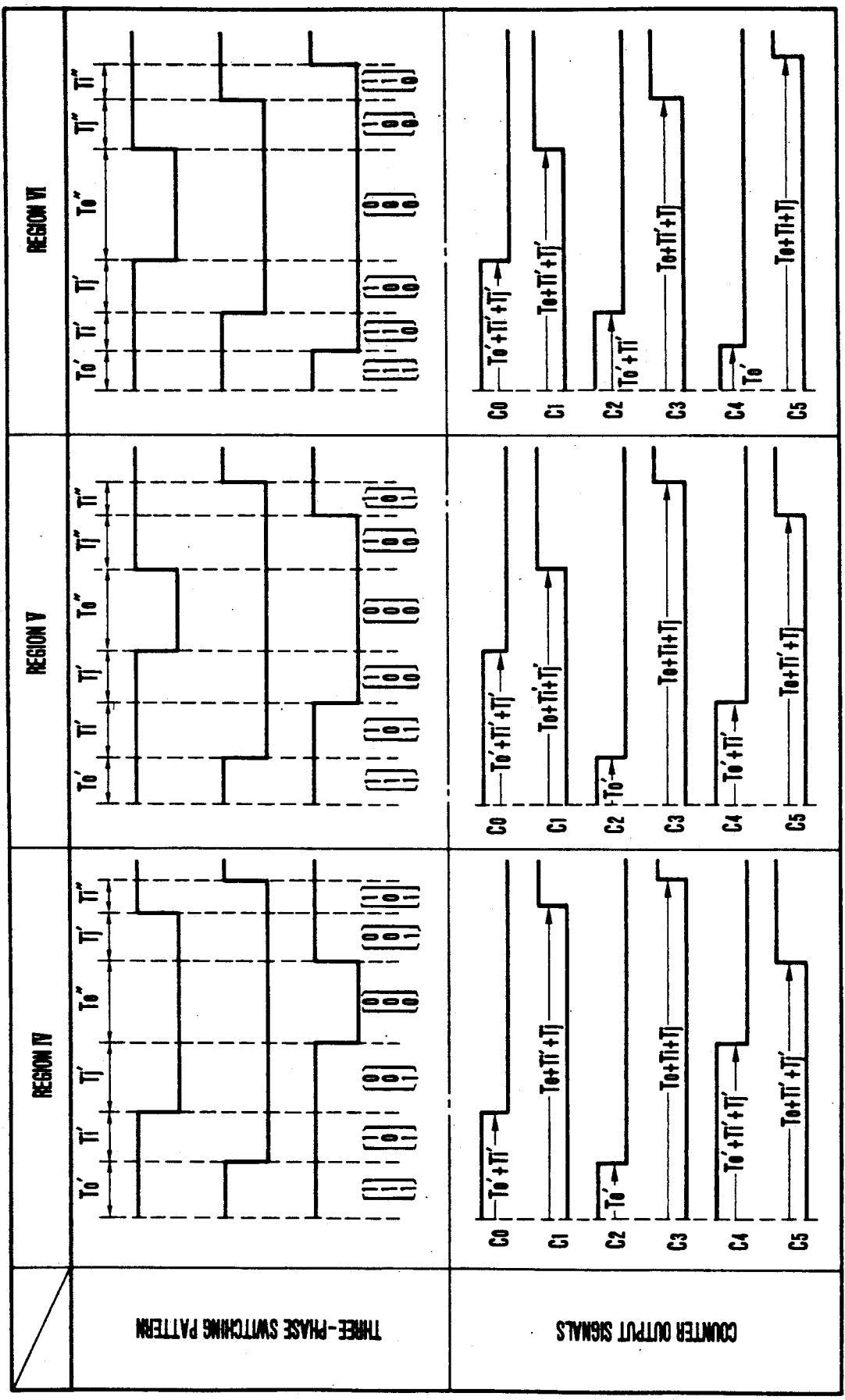

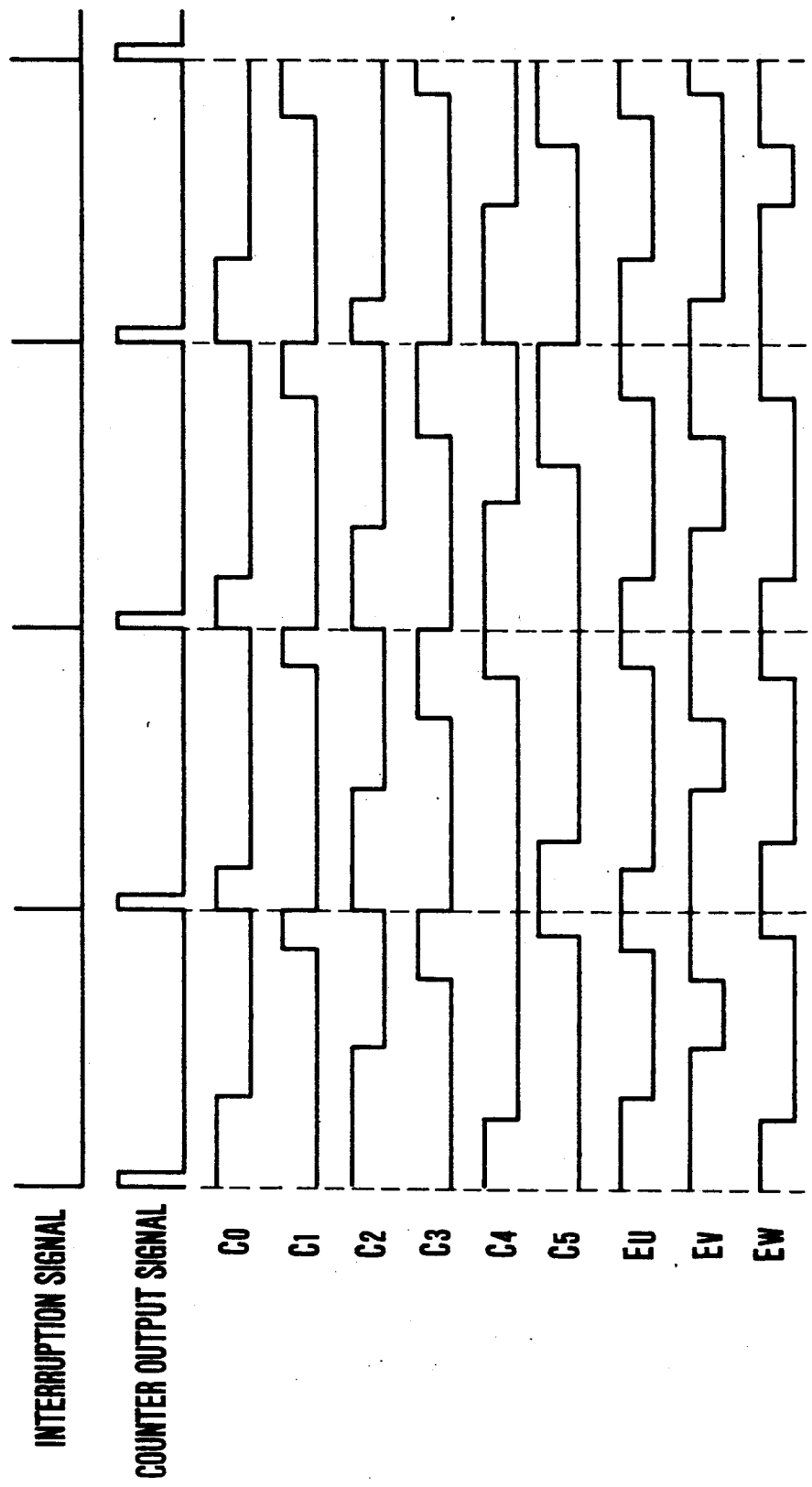

CONTROL METHOD OF PULSE WIDTH MODULATION INVERTER AND PULSE WIDTH MODULATION INVERTER SYSTEM

BACKGROUND OF THE INVENTION

This invention relates to a method of generating gate signals of a pulse width modulation (PWM) inverter adapted for variable speed drive of an AC motor and a PWM inverter system using the method.

Of methods for generation of gate signals of a PWM inverter, such a method as disclosed in JP-A-59-25592 and copending U.S. patent application Ser. No. 380,039 entitled "PWM Inverter Apparatus" is known wherein two voltage vectors and a zero vector are used to determine gate signals by which the voltage vectors are caused to move along a magnetic flux circle. In the known method, duration times of the two voltage vectors are reserved within a control period (sampling period) and the remaining time is allotted to a duration time of the zero vector. Thus, the switching frequency of the PWM inverter is determined in the known method depending on the number of combinations of the voltage vectors and zero vector within the sampling period. Specifically, the greater the number of combinations of the voltage vectors and zero vector within the sampling period, the greater the switching frequency of the PWM inverter.

In the prior art, however, when the angular speed of the magnetic flux changes, the duration time of any of the voltage vectors and zero vector is rendered zero within the sampling period and as a result, the switching frequency of the PWM inverter is decreased. This raises problems that distortion of a voltage waveform is increased to entail an increase in noise in the motor.

SUMMARY OF THE INVENTION

An object of this invention is to provide a method of fixing the switching frequency of the PWM inverter in PWM control of spatial vector type.

Another object of this invention is to provide a control method capable of improving the voltage utilization efficiency and reducing the voltage waveform distortion even in the region where the decrease in the switching frequency of the PWM inverter is conventionally inevitable.

Still another object of this invention is to provide a PWM inverter system capable of reducing the motor noise by using the aforementioned control method.

In order to attain the above objects, a difference vector $\tilde{e}(n)$ between a magnetic flux vector $\tilde{\phi}(n-1)$ obtained at time $(n-1)$ and a magnetic flux vector $\tilde{\phi}(n)$ obtained at time n is determined by synthesizing a plurality of unit voltage vectors in such a manner that a resultant vector representative of the difference vector always includes as a component a zero vector or a voltage vector having a predetermined duration time, and the resultant vector is used to generate gate signals of switching elements of the PWM inverter.

When a resultant voltage vector (having a constant magnitude) of voltage vectors and a zero vector moves along a magnetic flux circle having a constant magnitude, the duration times of the voltage vectors and the zero vector change depending upon the phase of rotation of the magnetic flux. At certain rotation phases, the duration time of the voltage vector or the zero vector is rendered zero. More specifically, as the angular speed of the magnetic flux increases the duration time of the voltage vector has to be increased in order to permit the resultant voltage vector to move along the magnetic flux circle having the constant magnitude. Therefore, the more the angular speed of the magnetic flux increases, the more the occupation ratio of the zero vector in the resultant voltage vector decreases to increase the occupation ratio of the voltage vector correspondingly. Accordingly, in the region where the inverter frequency is high, the duration time of the zero vector is frequently rendered zero. When the duration time of the zero vector is rendered zero and the sampling period Ts coincides with the duration time of the resultant voltage vector, the sampling period Ts is totally occupied by the voltage vector and consequently the switching frequency of the PWM inverter is decreased.

On the other hand, as the angular speed of the magnetic flux decreases, a reverse phenomenon occurs wherein the duration time of the voltage vector is frequently rendered zero and the sampling period Ts is totally occupied by the zero vector to again decrease the switching frequency of the PWM inverter.

In accordance with the present invention, the resultant voltage vector is so determined that the duration times of the voltage vectors and the zero vector can always be maintained, amounting to a predetermined time $\Delta T$ by which a minimum pulse width is expected to be maintained. This ensures that even when any of the voltage vectors and zero vector is rendered zero as the angular speed of the magnetic flux changes, a resultant voltage vector can persist which includes as a component the voltage vector or the zero vector having the predetermined minimum time $\Delta T$. As a result, even when the phase or angular speed of the magnetic flux changes, the switching frequency of the PWM inverter is fixed to a frequency determined by the resultant voltage vector.

BRIEF DESCRIPTION OF THE DRAWINGS

FIG. 4 is a diagram showing the relation between the magnetic flux vectors and a voltage vector.

FIG. 5 is a table showing the relation between unit voltage vectors and a phase angle $\alpha$.

FIG. 8 is a flow chart for execution of control in the invention.

FIGS. 9 and 10 are diagrams showing the relation between a three-phase switching pattern and output signals of counters.

FIG. 11 is a timing chart showing the procedure through which the PWM signals are produced from the counter output signals.

DESCRIPTION OF THE PREFERRED EMBODIMENT

Figure 1:
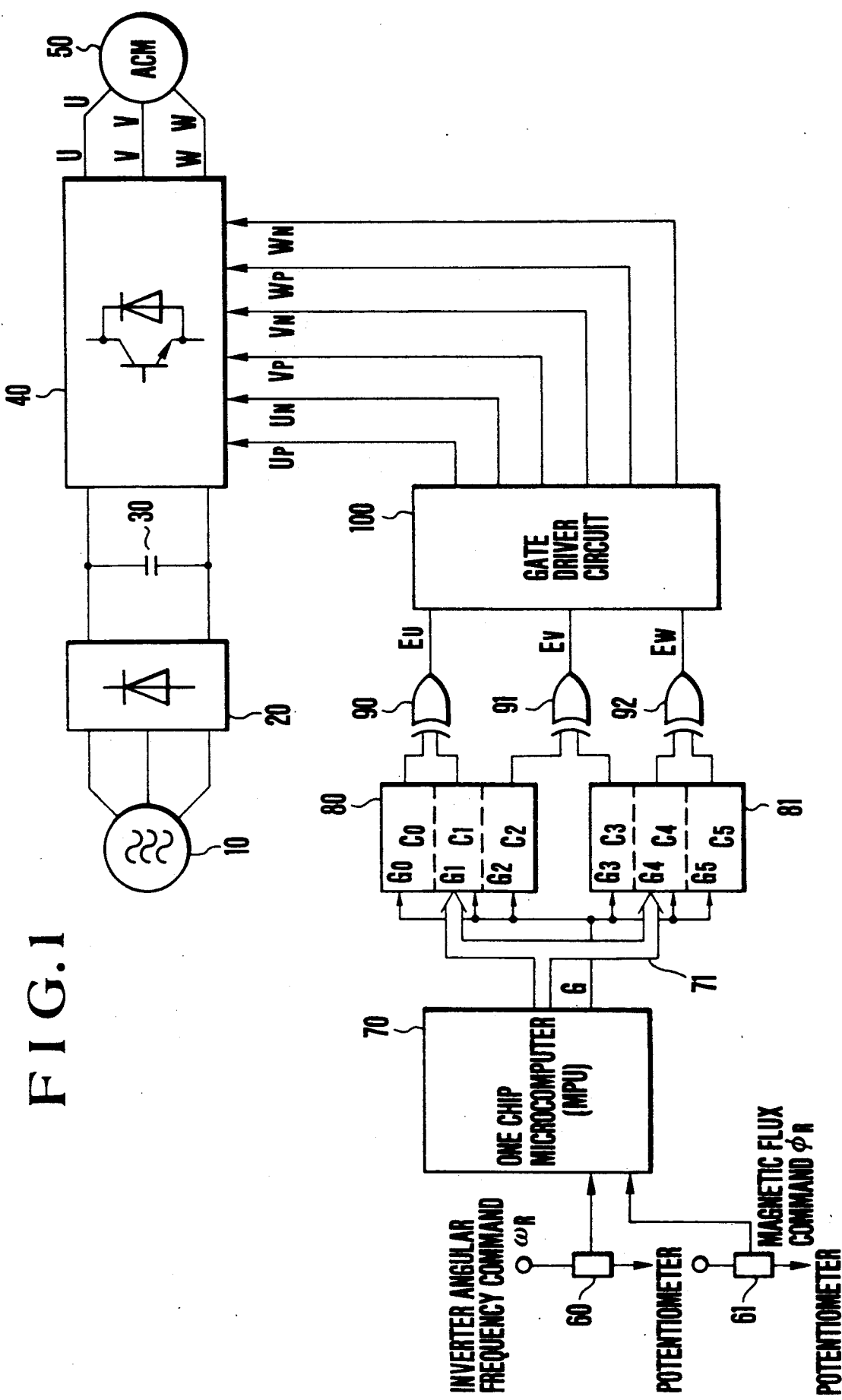
FIG. 1 is a schematic diagram showing the overall construction of a PWM inverter system according to an embodiment of the invention.

Referring now to FIG. 1, an embodiment of the invention will be described. FIG. 1 shows the overall construction of a PWM inverter system according to the invention. A three-phase AC power supply 10 is connected to a converter 20 and the output terminal of the converter 20 is connected to the input terminal of a PWM inverter 40, comprised of a plurality of switching elements, by way of a smoothing capacitor 30. The converter 20 and PWM inverter 40 may be constructed of known circuits and will not be detailed herein.

Respective output terminals U, V and W of the PWM inverter 40 are connected to respective terminals U, V and W of an AC motor 50.

The construction of a control circuit for controlling the gates of the PWM inverter 40 will now be described.

An inverter angular frequency command $\phi_R$ and a magnetic flux command $\phi_R$ are set by potentiometers 60 and 61, respectively. The output terminals of the potentiometers 60 and 61 are connected to the input terminals of an A/D converter (not shown) of a one-chip microcomputer 70. In addition to the A/D converter, the one-chip microcomputer 70 incorporates memories such as RAM'S and EPROM'S and a timer which are not illustrated, either. A data bus 71 of the one-chip microcomputer 70 is coupled to data bus lines of timer modules 80 and 81, each having a plurality of timers, and an I/0 port G of the microcomputer 70 is connected to gate terminals $G_0$ to $G_2$ of the timer module 80 and gate terminals $G_3$ to $G_5$ of the timer module 81. In addition, the provision of an address bus is needed to enable the one-chip microcomputer 70 to write data in the timer modules 80 and 81 but the address bus is omitted in FIG. 1 to show only the fundamental construction.

Each of the timer modules 80 and 81 incorporates three timers and these timers have output terminals $C_0$ and $C_1$ connected to input terminals of an exclusive OR circuit 90, output terminals $C_2$ and $C_3$ connected to input terminals of an exclusive OR circuit 91 and output terminals $C_4$ and $C_5$ connected to input terminals of an exclusive OR circuit 92. Output terminals of the exclusive OR circuits 90, 91 and 92 are connected to input terminals of a gate driver circuit 100. In a later description, the timers and their output terminals will be referred to as counters $C_0$ to $C_5$.

Output terminals of the gate driver circuit 100 are respectively connected to gates of six switching elements constituting phase arms of the PWM inverter.

A method of controlling PWM signals and the operation of the circuit shown in FIG. 1 based on the control method will now be described. Since the PWM inverter 40 is a three-phase inverter, the respective phases are gated in accordance with $2^3$ combinations of gate signals. The combination of gate signals provides a switching pattern and is represented by (U, V, W) wherein an "ON" state of switching elements of the respective phases is indicated by "1" and an "OFF" state is indicated by "0". For example, (1, 0, 0) therefore represents a state where a switching element of a U-phase positive arm is "ON", a switching element of a V-phase positive arm is "OFF" and a switching element of a W-phase positive arm is "OFF". Switching elements of negative arms of the respective phases operate complementarily to the switching elements of positive arms. In other words, while a switching element of a positive arm is "ON", a switching element of the corresponding negative arm is rendered "OFF".

Figures 2, 3:
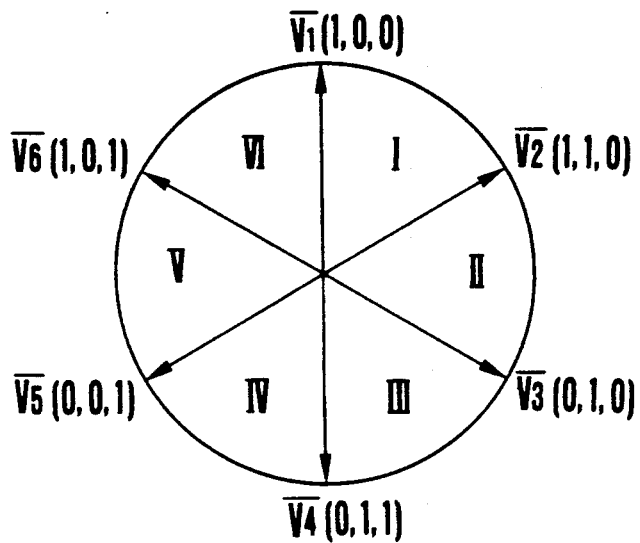
FIG. 2 is a vector diagram illustrating unit voltage vectors.
FIG. 3 is a table showing a set of unit voltage vectors to be selected in each of the phase regions of a magnetic flux vector.

When the switching pattern is defined as above, the output vectors produced by the inverter at its states represented by the switching patterns (1, 0, 0), (1, 1, 0), (0, 1, 0), (0, 1, 1), (0, 0, 1), (1, 0, 1) have directions, respectively, as shown in FIG. 2. Here, the vectors having the above directions and unit magnitude are called unit voltage vectors. The inverter outputs corresponding to the remaining states of the switching elements represented by the switching patterns (0, 0, 0) and (1, 1, 1) have zero magnitude. The vectors of these outputs are called unit zero vectors and are indicated by $V_0$ and $V_7$, respectively. The unit voltage vectors are respectively indicated by $\tilde{V}_1$, $\tilde{V}_2$, $\tilde{V}_3$, $\tilde{V}_4$, $\tilde{V}_5$ and $\tilde{V}_6$ as shown in FIG. 2.

The relation between a magnetic flux vector $\tilde{\phi}(t)$ and a voltage vector $\tilde{V}(t)$ induced in the motor is given by equation (1):

$$d\tilde{\phi}(t)/dt = \tilde{V}(t) \tag{1}$$

When the magnetic flux vector is given by $\tilde{\phi}(t) = \phi_0 e^{j\omega t}$, the magnetic flux vector $\tilde{\phi}(t)$ traces a circular locus of a radius $\phi_0$ and the voltage vector $\tilde{V}(t)$ acts in the tangential direction of the circular locus. Equation (1) can be reduced to a difference form which is given by equation (2):

$$\tilde{\phi}(n) - \tilde{\phi}(n-1) = T_s \tilde{V}(n) \tag{2}$$

$T_s$: sampling period.

In equation (2), the left side indicates a difference vector between a magnetic flux vector $\tilde{\phi}(n)$ at time n and a magnetic flux vector $\tilde{\phi}(n-1)$ at time $(n-1)$, and this difference vector is represented by $\tilde{e}(n)$. Then, the difference vector $\tilde{e}(n)$ can be obtained by synthesizing selectively the unit voltage vectors $\tilde{V}_1$ to $\tilde{V}_6$ and unit zero vectors $\tilde{V}_0$ and $\tilde{V}_7$ as will be described below.

In order to synthesize the difference vector, which is generally different in vector direction from any of the unit voltage vectors, selection is made to use two of the unit voltage vectors, as shown in FIG. 3, having a phase difference of 60° therebetween and determined depending on which of the regions I to VI shown in FIG. 2 the phase of the difference vector belongs to.

FIG. 4 shows diagrammatically the manner of synthesizing unit voltage vectors $\tilde{v}i$ and $\tilde{v}j$ and a unit zero vector $\tilde{v}_0$ ($\tilde{v}_7$) to provide a difference vector $\tilde{e}(n)$. Equation (2) prescribes that the duration time of the difference vector $\tilde{e}(n)$ should coincide with the sampling period Ts. More specifically, the magnitudes of voltage vectors $\tilde{V}i$ and $\tilde{V}j$ determined by using $\tilde{v}i$ and $\tilde{v}j$ are equal to the product of unit voltage vector $\tilde{v}i$ and its duration time $T_i$ and the product of unit voltage vector $\tilde{v}j$ and its duration time $T_j$, the magnitude of zero vector $\tilde{V}0$ equals the product of unit zero vector $\tilde{v}_0$ or $\tilde{v}_7$ and its duration time T0, and the following equations must stand:

$$\begin{aligned}\tilde{e}(n) &= \tilde{V}_i + \tilde{V}_j + \tilde{V}_0 \\ &= T_i\tilde{v}_i + T_j\tilde{v}_j + T_0\tilde{v}_0\end{aligned} \tag{3}$$

$$T_s = T_i + T_j + T_0 \tag{4}$$

where the duration times Ti and Tj are given by equations (5) and (6), respectively:

$$T_i = \frac{l\Delta t}{\sin 120°} \cdot \sin\alpha \qquad (5)$$

$$T_j = \frac{l\Delta t}{\sin 120°} \cdot \sin(60° - \alpha). \qquad (6)$$

In equations (5) and (6), l represents the magnitude of the difference vector, that is the distance which the difference vector moves from A to B in FIG. 4 during one sampling period Ts. The value of l is determined by the following equations:

$$= \Delta\theta(n) \cdot \phi_0 \qquad (7)$$

$$\Delta\theta(n) = \omega_1 Ts \qquad (8).$$

Represented by $\Delta t$ is a time conversion coefficient for converting the magnitude l of the difference vector into a value represented by a unit of time and by $\alpha$ is a phase angle. In equation (8), $\omega_1$ represents angular speed of rotation of the magnetic flux vector $\phi(n)$ and it coincides with the inverter angular frequency command $\omega_R$ shown in FIG. 1. Equation (7) is determined on the assumption that $\phi_o$ remains unchanged during the sampling period Ts.

The phase angle $\alpha$ in equations (5) and (6) is given depending on unit voltage vectors used, as shown in FIG. 5. Also indicated in FIG. 5 is an instantaneous rotation phase $\theta_R*$ of magnetic flux vector $\phi(n)$ which is given by equation (9):

$$\theta_R* = \sum_{k=1}^{n-1} \Delta\theta(k). \qquad (9)$$

As described previously, the magnetic flux vector $\overline{\phi}(n)$ rotates at the angular speed $\omega_1$ and the system is activated at each predetermined sampling period Ts. The duration times Ti and Tj of the voltage vectors $\overline{V}i$ and $\overline{V}j$ are given by equations (5) and (6), and a duration time Ti+Tj of a resultant vector of $\overline{V}i$ and $\overline{V}j$ is maximized at a phase angle $\alpha$ of 30°. As the angular speed $\omega_1$ increases, the distance l over which the difference vector moves within Ts increases and therefore, in some cases, the magnitude of (Ti+Tj) goes beyond the sampling period Ts. Such a state occurs initially in synchronism with the phase angle $\alpha$ being 30° and as the angular speed $\omega_1$ increases, it gradually spreads about the 30° phase angle.

Figure 6A:
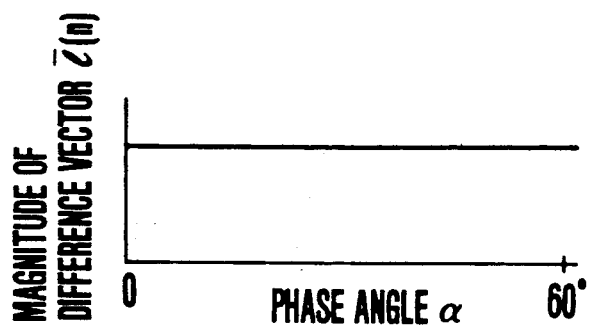
FIG. 6A is a graph showing the relation between the magnitude of a difference vector and the phase angle $\alpha$ in the conventional method.
Figure 6B:
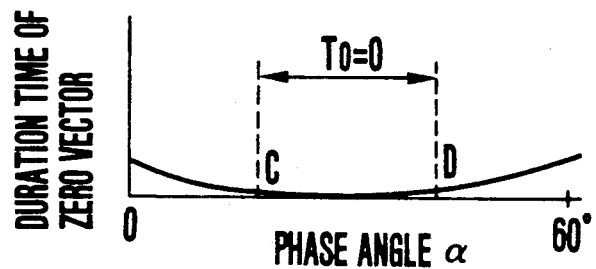
FIG. 6B is a graph showing the relation between the duration time of a zero vector and the phase angle $\alpha$ in the conventional method.

FIGS. 6A and 6B are conducive to explain that state. FIG. 6B particularly demonstrates that for the phase angle o falling within an interval ranging from C to D, the duration time $T_0$ of the zero vector $\overline{V}_0$ is rendered zero. Thus, within that interval, the zero vector $\overline{V}_0$ in the difference vector $\overline{e}(n)$ is excluded to disappear and the difference vector $\overline{e}(n)$ equals the sum of voltage vectors $\overline{V}i$ and $\overline{V}j$. It follows therefore that within that interval, the switching pattern for making zero the output voltage of the PWM inverter disappears and the switching frequency decreases. To overcome this problem, the decrease in switching frequency may be suppressed in a manner to be described below. Given that the minimum duration time necessary for insuring the generation of a switching pulse is $\Delta T$, the upper limit of the distance l over which the difference vector $\overline{e}(n)$ moves is set in order for the duration time of the resultant voltage vector of the voltage vectors $\overline{V}i$ and $\overline{V}j$ not to exceed $(T_s - \Delta T)$. The value of the upper limit is controlled pursuant to the following equation:

$$(l_{max} \cdot \Delta t) = \frac{(T_s - \Delta T)\sin 120°}{\cos(30° - \alpha)} \qquad (10)$$

Accordingly, the duration time $l\Delta t$ of the difference vector which is used in equations (5) and (6) is always determined so as not to exceed $(l_{max} \cdot \Delta t)$ given by equation (10).

Figure 7A:
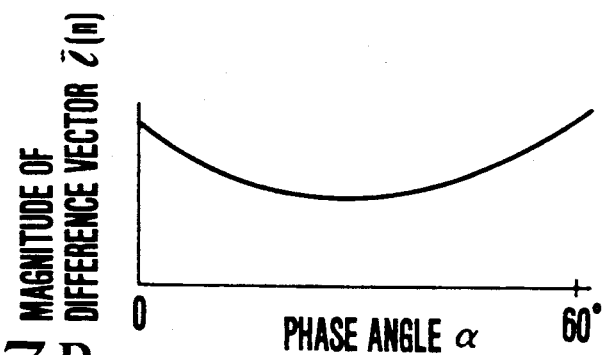
FIGS. 7A and 7B are graphs, similar to those of FIGS. 6A and 6B, in the method according to the invention.
Figure 7B:
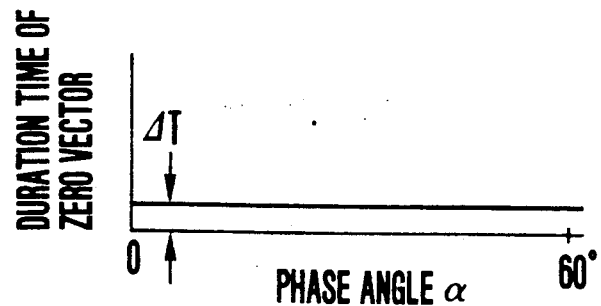

When the above control method is applied to the case where Ti+Tj would otherwise go beyond Ts, the duration time of the zero vector $\overline{V}_0$ is related to the phase angle $\alpha$ as shown in FIG. 7B and the magnitude (duration time) of the difference vector $\overline{e}(n)$ changes with the phase angle $\alpha$ as shown in FIG. 7A. Since the zero vector $\overline{V}_0$ can always be maintained during $\Delta T$, the disappearance of the zero vector $\overline{V}_0$ can be suppressed through this method to thereby suppress the decrease in switching frequency.

As the angular speed $\omega_1$ of the magnetic flux vector $\overline{\phi}(n)$ decreases, the magnitude of the difference vector $\overline{e}(n)$ decreases in accordance with equations (7) and (8). The duration time of the difference vector e(n) is made zero when the duration time required for producing the difference vector falls below $\Delta t$ which is a minimum time determined for the system, for example, a machine cycle of the microcomputer. In such an event, the voltage vectors $\overline{V}i$ and $\overline{V}j$ disappear and the resultant voltage vector contains the zero vector $\overline{V}_0$ alone. Therefore, under this condition, the switching frequency of the PWM inverter also decreases. To cope with this problem, the duration time $l\Delta t$ of the difference vector $\overline{e}(n)$ is set so as not to fall below a lower limit $l_{min} \Delta t$. More specifically, the duration time $l\Delta t$ is so set as to satisfy equation (11):

$$(l_{min} \Delta t) = \frac{2T_{min} \cdot \sin 120°}{\cos(30° - \alpha)} \qquad (11)$$

in order to prevent the duration times of the voltage vectors $\overline{V}i$ and $\overline{V}j$ from falling below a lower limit $T_{min}$.

As is clear from the above, even when the angular speed $\omega_1$ of the magnetic flux vector $\overline{\phi}(n)$ changes, the disappearance of the zero vector $\overline{V}_0$ or voltage vectors $\overline{V}i$ and $\overline{V}j$, that is, the nullification of the duration time of each vector can be prevented by controlling the duration time $l\Delta t$ of the difference vector $\overline{e}(n)$ such that it satisfies equation (12):

$$l_{min} \Delta t \leq l\Delta t \leq l_{max} \cdot \Delta t. \qquad (12)$$

Alternatively, the relation equivalent to equation (12) can be obtained by applying upper and lower limiters to the magnitude of duration times Ti and Tj of the voltage vectors such that the duration times Ti and Tj of the voltage vectors determined pursuant to equations (5) and (6) do not exceed the lower limit $T_{min}$ and the upper limit $(T_s - \Delta T)$. In this case, however, it is necessary to check whether the magnitude of each of the duration times Ti and Tj of the voltage vectors falls within the range of from $T_{min}$ to $(T_s - \Delta T)$ and therefore the processing time of the one-chip microcomputer 70 is increased.

By using the previously-described principle, gate signals for the PWM inverter can be obtained through operation to be described hereunder. Firstly, the calculation procedure for setting data in the counters $C_0$, $C_1$, $C_2$, $C_3$, $C_4$ and $C_5$ under the control of the one-chip microcomputer 70 will be described with reference to a flow chart of FIG. 8. The procedure shown in FIG. 8 is an interruption processing routine.

(i) Processing 200A

When an interruption occurs, processing 200A is first executed. In processing 200A, T+Ts (T: a value of a timer at the present time) is set in the timer built in the one-chip microcomputer 70. The timer generates an interruption signal at the expiration of time Ts. Since this processing is carried out in order for each interruption signal to occur, the interruption signals are generated reiteratively at a period of Ts.

(ii) Processing 200B

An inverter angular frequency command $\omega_R$, that is, an angular speed $\omega_1$ of the magnetic flux vector $\bar{\phi}(n)$ is fetched through the A/D converter and the angular speed $\omega_1$ is multiplied by the sampling period Ts to determine a difference angle $\Delta\theta(n)$ through which the magnetic flux vector $\bar{\phi}(n)$ moves within the sampling period Ts.

(iii) Processing 200C

Difference angles $\Delta\theta(n)$ obtained in the processing 200B are sequentially added together to determine an instantaneous phase $\theta_R^*$ of the magnetic flux vector $\bar{\phi}(n)$. In this processing, comparison is also carried out between a value of the instantaneous phase $\theta_R^*$ and a value $\theta_0^*$ thereof which measures $2\pi$ to correspond to one period, so that when $\theta_R^*$ exceeds $\theta_0^*$, the value of the instantaneous phase $\theta_R^*$ is reset to thereby permit the instantaneous phase $\theta_R^*$ to recur at a period of $2\pi$.

(iv) Processing 200D

It is decided on the basis of the instantaneous phase $\theta_R^*$ of the magnetic flux vector which region shown in FIG. 3 the instantaneous phase $\theta_R^*$ lies in, in order to determine a set of unit voltage vectors $\bar{v}i$ and $\bar{v}j$ to be used. Subsequently, a phase angle $\alpha$ complying with those $\bar{v}i$ and $\bar{v}j$ is calculated pursuant to formulae shown in FIG. 5.

(v) Processing 200E

A magnetic flux command $\phi_R$ is fetched through the A/D converter included in the one-chip microcomputer 70. This command is multiplied by the difference angle $\Delta\theta(n)$ obtained in the processing 200B and the product is multiplied by the time conversion coefficient $\Delta t$ to determine a duration time $l\Delta t$ of the difference vector $\bar{e}(n)$. Further, the duration time $l\Delta t$ is processed through limiter processing so as to satisfy equation (12).

(vi) Processing 200F

Figure 9:
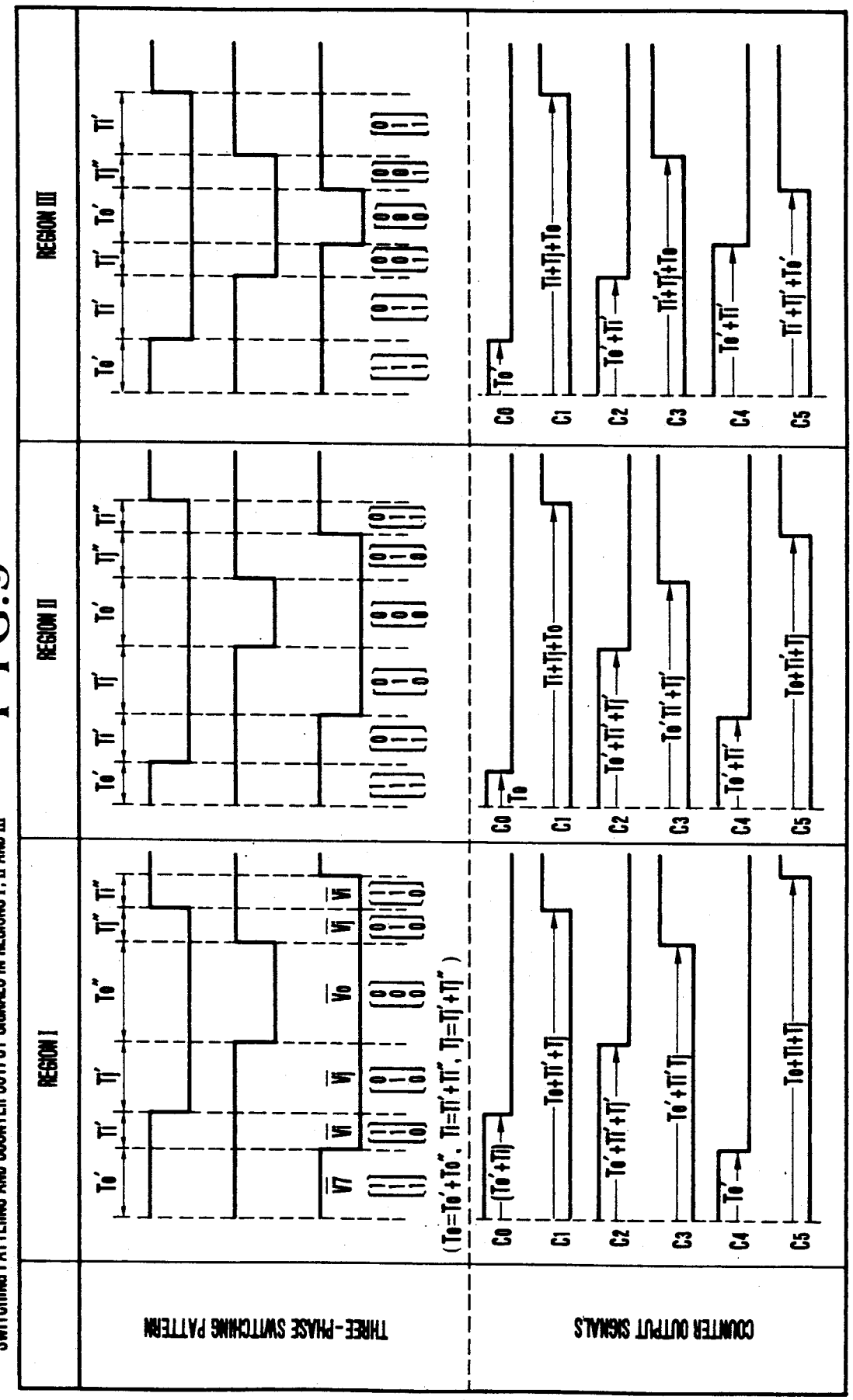

By using the phase angle $\alpha$ and the duration time $l\Delta t$ of the difference vector, duration times Ti and Tj of the voltage vectors $\bar{V}i$ and $\bar{V}j$ are calculated pursuant to equations (5) and (6). Duration time $T_0$ of the zero vector $\bar{V}_0$ is determined pursuant to $T_s-(T_i+T_j)$. Thus, a resultant voltage vector $T_i\bar{v}_i+T_j\bar{v}_j+T_0\bar{v}_0$ representative of the difference vector e(n) can be obtained. In accordance with teachings of the embodiment, the voltage vectors $\bar{V}i$ and $\bar{V}j$ and zero vector $\bar{V}_0$ and are each divided into portions in order to improve the switching frequency. For example, division into two portions may be employed as shown in FIGS. 9 and 10. In this case, the difference vector e(n) is expressed as follows:

$$\bar{e}(n)=T_0'\bar{v}_1+T_i'\bar{v}_i+T_j'\bar{v}_j+T_0''\bar{v}_0+T_j''\bar{v}_j+T_i''\bar{v}_i \qquad (13)$$

where $T_i=T_i'+T_i''$, $T_j=T_j'+T_j''$ and $T_0=T_0'+T_0''$ stand. The zero vector $\bar{V}_0$ is inserted so that a change in switching mode of only one phase is caused by the zero vector. For example, within the region I, the unit zero vector and unit voltage vector change such that (1, 1, 1)→(1, 1, 0)→(0, 1, 0)→(0, 0, 0) →(0, 1, 0)→(1, 1, 0). Thus, although the unit voltage vectors $\bar{v}i$ and $\bar{v}j$ have sets of elements which are different for the respective regions, the zero vector $\bar{V}_0$ and the voltage vectors $\bar{V}i$ and $\bar{V}j$ are synthesized in a regular sequence complying with equation (13).

(vii) Processing 200G

In processing 200G, data is set in the counters $C_0$ to $C_5$ to ensure that the zero vector $\bar{V}_0$ and voltage vectors $\bar{V}i$ and $\bar{V}j$ can be synthesized in a regular sequence complying with equation (13). For example, within the region I, $(T_0'+T_i')$ is set in the counter $C_0$ and $(T_0+T_i'+T_j')$ is set in the counter $C_1$. As soon as the counter $C_0$ is set with the data $(T_0'+T_i')$, the output of the counter $C_0$ rises from "Low" level to "High" level and at the expiration of time $(T_0'+T_i')$, the output of the counter $C_0$ falls from "High" level to "Low" level. Conversely, as soon as the data $(T_0+T_i'+T_j')$ is set in the counter $C_1$, the output of the counter $C_1$ falls from "High" level to "Low" level and at the expiration of time $(T_0+T_i'+T_j')$, it rises from "Low" level to "High" level.

Similar operations are carried out in a set of counters $C_2$ and $C_3$ and in a set of counters $C_4$ and $C_5$.

As the procedure proceeds from processing 200A to processing 200G each time an interruption signal occurs, output signals of the timer modules 80 and 81 change as shown in a time chart of FIG. 11. Since the exclusive OR circuits 90, 91 and 92 are connected to the output terminals of the timer modules 80 and 81, exclusive OR operations $C_0$ output $\oplus$ $C_1$ output, $C_2$ output $\oplus$ $C_3$ output and $C_4$ output $\oplus$ $C_5$ output are effected to provide three-phase PWM signals $E_U$, $E_V$ and $E_W$ as shown in FIG. 11.

By receiving the signals $E_U$, $E_V$ and $E_W$, the gate driver circuit 100 produces gate signals $U_P$, $U_n$, $V_p$, $V_n$, $W_p$ and $W_N$ applied to the gates constituting the respective phase arms. The gate signals may be generated in a manner known in the art and will not be detailed herein.

According to the invention, even when the angular frequency of the inverter changes, the decrease in switching frequency can be suppressed and consequently current ripple can be reduced and at the same time noise in the motor can be reduced.

Further, since the switching frequency is suppressed by minimizing the duration time of the zero vector, voltage utilization efficiency can be improved in the high speed region and high level torque can be produced.

We claim:

1. A control method for a pulse width modulation (PWM) inverter in which a magnetic flux vector is determined from an inverter angular frequency command and a magnetic flux command, a plurality of voltage vectors are determined from said magnetic flux vector, unit voltage vectors, and a zero vector, and gate signals for a plurality of switching elements of the PWM inverter are generated in correspondence to said plurality of voltage vectors to control said PWM inverter, said control method comprising the steps of:

determining a current magnetic flux vector during a current sampling period on the basis of said inverter angular frequency command, said magnetic flux command, and a duration of said current sampling;

determining a difference vector representing a difference between said current magnetic flux vector and a preceding magnetic flux vector determined during a preceding sampling period by synthesizing said difference vector from said unit voltage vectors and said zero vector such that the difference vector includes said zero vector such that said zero vector has at least a predetermined duration time; and generating the gate signals for said switching elements of said PWM inverter in accordance with said synthesized difference vector.

2. A control method for a PWM inverter according to claim 1, wherein the difference vector is synthesized such that a sum of duration times of said unit unit voltage vectors does not exceed the duration of said current sampling period less said predetermined duration time of said zero vector.

3. A control method for a PWM inverter according to claim 2, wherein said difference vector is synthesized from unit voltage vectors $\widetilde{V}i$ and $\widetilde{V}j$ having an angle of 60° therebetween and a zero vector $\widetilde{V}_0$ in accordance with the following equations:

$$\widetilde{e}(n) = T_i \widetilde{v}_i + T_j \widetilde{v}_j + T_0 \widetilde{v}_0$$

$$T_i = \frac{(l \cdot \Delta t)}{\sin(120°)} \sin(60° - \alpha)$$

$$T_j = \frac{(l\Delta \cdot t)}{\sin(120°)} \sin\alpha$$

$$T_0 = T_s - (T_i + T_j)$$

where
$\widetilde{e}(n)$: the difference vector
$T_i, T_j$: duration times of the unit voltage vectors
$T_0$: a duration time of the zero vector
$l$: a magnitude of the difference vector
$\Delta t$: a time conversion coefficient
$\alpha$: an angle relative to the difference vector of the unit voltage vectors $\widetilde{V}_i$ and $\widetilde{V}_j$ determined on the basis of a phase of the magnetic flux in accordance with the following expression:

$$(l \cdot \Delta t) \leq \frac{(T_s - \Delta T)}{\cos(30° - \alpha)} \sin(120°)$$

where $T_s$ is the duration time of the current sampling period and $\Delta T$ is the predetermined duration time of the zero vector.

4. A control method for a PWM inverter according to claim 3, wherein the difference vector is synthesized from m sub-difference vectors (m being an integer), each sub-difference vector being synthesized from the unit voltage and zero vectors $V_i$, $V_j$, $V_0$ with the respective duration times $T_i$, $T_j$, $T_0$ being divided by m.

5. A control method of a pulse width modulation (PWM) inverter in which a magnetic flux vector is determined from an inverter angular frequency command and a magnetic flux command, a plurality of voltage vectors are determined from said magnetic flux vector, unit voltage vectors and a zero vector and gate signals of a plurality of switching elements of the PWM inverter are generated in correspondence to said voltage vectors to control said PWM inverter, said control method comprising:

determining a magnetic flux vector $\phi(n)$ on the basis of said inverter angular frequency command, said magnetic flux command and a sampling period;

determining a difference vector between said magnetic flux vector $\widetilde{\phi}(n)$ and a magnetic flux vector $\widetilde{\phi}(n-1)$ obtained during the preceding sampling period by synthesizing said unit voltage vectors and zero vector in such a manner that the difference vector includes as components voltage vectors other than said zero vector; and generating the gate signals of switching elements of said PWM inverter in accordance with said resulting difference vector.

6. A control method of a PWM inverter according to claim 5 wherein when the magnitude $l$ of the difference vector $\widetilde{e}(n)$ falls below a predetermined value $(l)min$, duration times of said voltage and zero vectors are determined on the basis of said predetermined value $(l)min$.

7. A control method for a pulse-width modulation (PWM) inverter having a plurality of switching elements in which gate signals for the switching elements are generated on the basis of an inverter angular frequency command and a magnetic flux command for controlling the PWM inverter, the method comprising the steps of:

determining, in each of plurality of sampling periods, a magnetic flux vector on the basis of the inverter angular frequency command, the magnetic flux command, and a duration time of one sampling period;

determining a difference vector representing a difference between a current magnetic flux vector determined in a current sampling period and a preceding magnetic flux vector determined in a preceding sampling period;

synthesizing the difference vector from unit voltage vectors and a zero vector such that at least one of a duration time of the zero vector, a sum of duration times of the unit voltage vectors, and a sum of duration times of the unit voltage vectors and the zero vector is not zero for any value of the inverter angular frequency command; and generating the gate signals, in each of the sampling periods, based on the unit voltage vectors and the zero vector from which the difference vector is synthesized.

8. A pulse-width modulation (PWM) inverter system including an AC motor, a converter for converting an AC power supply voltage into a DC output voltage, an inverter having a plurality of switching elements which are operable to convert the DC output voltage into a multi-phase AC voltage having a variable frequency, the multi-phase AC voltage being supplied to the AC motor, and a controller for generating gate signals for the switching elements of the inverter on the basis of an inverter angular frequency command and a magnetic flux command during each of a plurality of sampling periods, the system comprising:

means for determining, in each of the sampling periods, phases and duration times of the gate signals on the basis of the inverter angular frequency command and the magnetic flux command such that none of the gate signals has a duration time of zero; and means for generating PWM signals on the basis of the phases and duration times determined by the determining means, wherein the controller generates the gate signals on the basis of the PWM signal.

* * * * *